United States Patent
McGeer

(10) Patent No.: US 9,749,260 B2
(45) Date of Patent: Aug. 29, 2017

(54) IMPLEMENTING A TRANSITION PROTOCOL IN WHICH A FIRST RULE SET FOR ROUTING PACKETS RECEIVED BY A GROUP OF SWITCHES DURING A FIRST TIME PERIOD IS UPDATED TO A SECOND RULE SET

(75) Inventor: Patrick (Rick) McGeer, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 80 days.

(21) Appl. No.: 14/391,839

(22) PCT Filed: Jul. 31, 2012

(86) PCT No.: PCT/US2012/049030
§ 371 (c)(1),
(2), (4) Date: Mar. 3, 2015

(87) PCT Pub. No.: WO2014/021861
PCT Pub. Date: Feb. 6, 2014

(65) Prior Publication Data
US 2015/0350110 A1    Dec. 3, 2015

(51) Int. Cl.
*H04L 12/933* (2013.01)
*H04L 12/751* (2013.01)
(Continued)

(52) U.S. Cl.
CPC .......... *H04L 49/15* (2013.01); *H04L 12/5689* (2013.01); *H04L 45/02* (2013.01); *H04L 45/64* (2013.01)

(58) Field of Classification Search
CPC . H04L 49/15; H04L 12/5689; H04L 12/4625; H04L 45/02; H04L 45/66
See application file for complete search history.

(56) References Cited

U.S. PATENT DOCUMENTS

| 7,602,796 B2 * | 10/2009 | Scudder | H04L 45/02 370/392 |
| 8,693,344 B1 * | 4/2014 | Adams | H04L 49/65 370/241 |

(Continued)

FOREIGN PATENT DOCUMENTS

| CN | 102577275 | 7/2012 |
| WO | WO-2012020564 A1 | 2/2012 |

(Continued)

OTHER PUBLICATIONS

M. Reitblatt et al, Software updates for openflow networks: Change you can believe in. In Proceedings of HotNets, 2011.
(Continued)

*Primary Examiner* — Rasheed Gidado
(74) *Attorney, Agent, or Firm* — Hewlett Packard Enterprise Patent Department

(57) ABSTRACT

A transition protocol is provided herein in which a first rule set for routing packets received by a group of switches during a first time period is to be updated to a second rule set. During a transition period, at least some switches in the group of switches route packets to a controller, while other switches in the group of switches route packets to a next hop that is unchanged by the change in the rule set. The controller forwards packets that are received from at least some of the switches in the group to a destination node each of the packets, as determined from the updated rule set.

20 Claims, 3 Drawing Sheets

(51) Int. Cl.
H04L 12/54 (2013.01)
H04L 12/715 (2013.01)

(56) References Cited

U.S. PATENT DOCUMENTS

| | | | | |
|---|---|---|---|---|
| 8,817,621 B2* | 8/2014 | Casado | ............... | H04L 12/4633 370/235 |
| 8,897,134 B2* | 11/2014 | Kern | ................... | H04L 41/0816 370/235 |
| 9,559,948 B2* | 1/2017 | Narayanan | ............... | H04L 45/64 |
| 2011/0273988 A1 | 11/2011 | Tourrilhes et al. | | |
| 2011/0310901 A1 | 12/2011 | Uchida et al. | | |
| 2011/0317559 A1 | 12/2011 | Kern | | |
| 2013/0151685 A1* | 6/2013 | Bursell | ................... | H04L 45/66 709/223 |
| 2013/0266018 A1* | 10/2013 | Ashida | ................ | H04L 49/3009 370/392 |

FOREIGN PATENT DOCUMENTS

| WO | WO-2012077259 A1 | 6/2012 |
|---|---|---|
| WO | WO-2012081146 A1 | 6/2012 |
| WO | WO-2012081549 | 6/2012 |
| WO | WO-2012090354 A1 | 7/2012 |

OTHER PUBLICATIONS

Extended European Search Report, EP Application No. 12882394.5, Date: Feb. 17, 2016, pp. 1-5.
Richard Wang et al., "OpenFlow-Based Server Load Balancing Gone Wild," USENIX, Mar. 2, 2011, pp. 1-6.

* cited by examiner

IMPLEMENTING A TRANSITION PROTOCOL IN WHICH A FIRST RULE SET FOR ROUTING PACKETS RECEIVED BY A GROUP OF SWITCHES DURING A FIRST TIME PERIOD IS UPDATED TO A SECOND RULE SET

BACKGROUND

The behavior of networks under static conditions is well-understood. However, under dynamic conditions, when routes change, network behavior can become indeterminate, and a variety of pathological conditions can occur. In a standard network, for example, where route updates occur at each switch independently and asynchronously, in response to a variety of network events, the behavior of the network at any time is only stochastically predictable.

Some networks such as implemented by OpenFlow implement controllers to choose routes. For example, in an OpenFlow network, routes are chosen by a controller, and not by the action of an independent algorithm running on an individual switch. Thus, updates can occur at times chosen by the controller. But even in such networks, the controller cannot implement all switch updates instantaneously and synchronously. Switch updates can take and time, and are realized at different and unpredictable for each switch in the network. As a result, the path taken by a packet is dependent on which switches were updated and in which order. Further, packet arrival times at individual switches are unpredictable.

Figure 1:
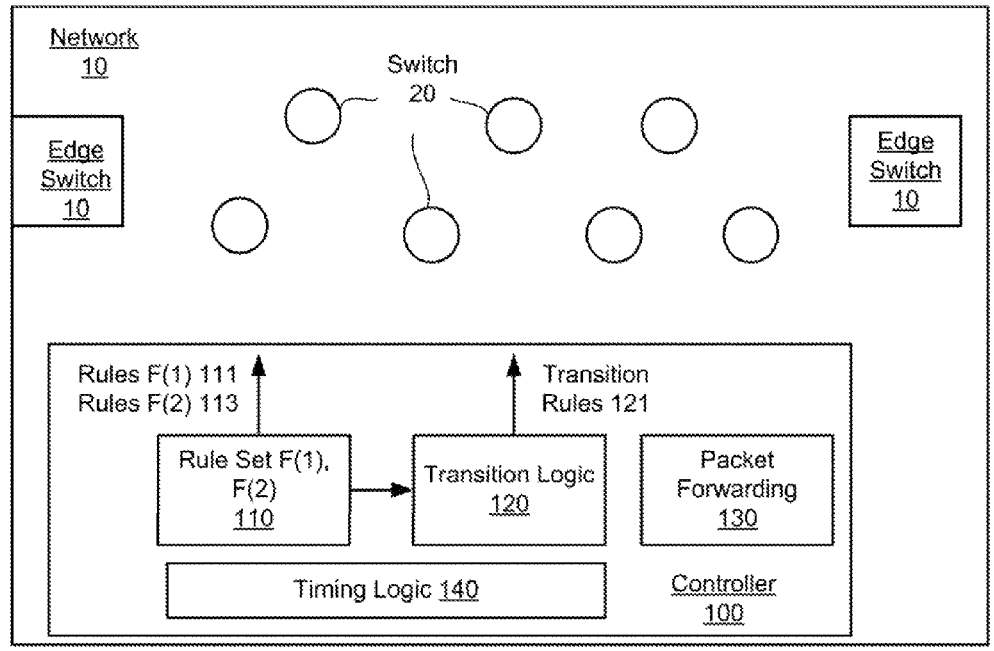
FIG. 1 illustrates an example of a controller for a network.

Embodiments described herein implement a transition protocol that can be implemented by a controller of a network. More specifically, a protocol is implemented on a network that provides for each packet passing through a network to be consistently handled by a single set of rules, even dynamic conditions when routing rules of the network are changed.

Among other benefits, implementation of a protocol such as described enables switch resources to be conserved, ensuring that only a single set of rules is present on a switch at any time. In examples described herein, when a network changes from one rule set (Rule Set 1) to another (Rule Set 2), the packets affected by the change are computed, and packets affected by the change are sent to the controller. When each switch has been updated to send affected packets to the controller, Rule Set 2 is sent to the switches and packets sent to the controller are rereleased into the network.

According to examples described herein, a controller for a network is provided. The controller is configured to implement a transition protocol in which a first rule set for routing packets received by a group of switches during a first time period is to be updated to a second rule set. The controller implements the transition protocol by implementing, during a first transition period, a transition rule set. The transition rule set provides that (i) any switch in the group of switches that is to forward packets to a same given node under both the first rule set and the second rule set will continue to forward packets to the given node during the first transition period, and (ii) any switch in the group of switches that is to forward packets to a node under the second rule set that is different than a node that the switch forwarded packets to under the first rule set will forward packets to the controller. During a subsequent time period following the first transition period, packets received from any switch in the first transition period are sent by the controller to a destination node in accordance with the second rule set, and implementing the second rule set for each switch in the group of switches.

In variations, a group of switches can be operated by each switch individually forwarding each packet to a next hop for that switch as designated by a first rule set. When a transition rule set is received from a controller, individual switches in a first set of switches forward each packet to the next hop for that switch as designated by both the first rule set and by a second rule set that is to be implemented after the first rule set. During a transition period after the transition rule set is received, a second set of switches forward each packet to the controller for forwarding to a destination node that is to be designated by the second rule set. The switches of the second set may include those switches that are to have their next hops changed as a result of the change from the first rule set to the second rule set.

Still further, a transition protocol is provided herein in which a first rule set for routing packets received by a group of switches during a first time period is to be updated to a second rule set. During a transition period, at least some switches in the group of switches route packets to a controller, while other switches in the group of switches route packets to a next hop that is unchanged by the change in the rule set. The controller forwards packets that are received from at least some of the switches in the group to a destination node each of the packets, as determined from the updated rule set.

Controller

FIG. 1 illustrates an example of a controller for a network. In an example of FIG. 1, a network 10 includes a controller 100, edge switches 12, and a group of switches 20. The controller 100 includes logic 110 that implements rule sets to control how each switch forwards a data packet. In the example of FIG. 1, the controller can implement a first rule set 111, then transition to a second or updated rule set 113. In order to transition between rule sets 111, 113, controller 100 includes transition logic 120 that implements a transition protocol. The transition protocol includes determination of a set of transition rules 121 that are determined by the transition logic 120. The transition logic 120 can determine the transition rules 121 based on a determination of packets that would be treated differently under the second rule set 113. For those packets, the transition logic 120 dictates that the packets are forwarded to the controller 120. As described with examples below, the transition rules 121 ensure that individual packets received by each of the switches 20 are handled consistently by a single rule set, even during an update between rule sets.

As mentioned, when implemented, the transition rules 121 may require some switches 20 in the group to forward packets to the controller 100. Packet forwarding logic 130 on the controller 100 can forward packets to a destination node (e.g., another switch, edge node). The packet forwarding operation performed by the controller 100 can insert the packet at any point in the packet's path that is between the forwarding switch 20 and the packet's destination node within the packet, in accordance with the second rule set 113. For example, the controller 100 can insert the packet at a next hop for the forwarding packet or at some other node prior to the destination node for the packet.

In an example of FIG. 1, the transition protocol can also implement timing stages (or epochs) during which transition between rules occurs on each switch. Among other determinations, the timing logic 140 can determine when the controller 100 signals the updated or second rule set 113 after signaling the transition logic 121. The timing logic 140 can extend the duration for when the transition rules 121 is in effect based on each switch 20 acknowledging receipt of the transition rules 121. Additionally, the timing logic 140 can also account for network latency, so as to maintain the transition rules 121 for duration of time after receipt of acknowledgements from each switch 20, where the duration is based on a latency measurement that is as long as the maximum estimated time for a packet to transition the network.

Methodology

Figure 2:
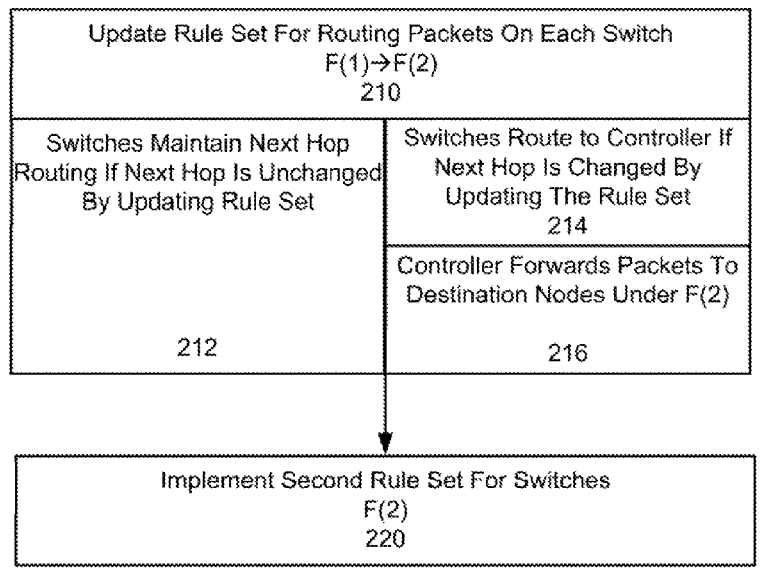
FIG. 2 illustrates an example method for implementing a transition protocol to control switches of a network in updating a rule set for routing packets on the network.

FIG. 2 illustrates an example method for implementing a transition protocol to control switches of a network in updating a rule set for routing packets on the network. In one implementation, a method such as described by an example of FIG. 2 can be implemented in an OpenFlow network. In describing an example of FIG. 2, reference may be made to components of FIG. 1 for purpose of illustrating suitable elements for performing a step or sub-step being described.

The controller 100 can update a rule set for routing packets on each switch (210). For example, the controller 100 can implement a first rule set F(1) during a time period, then implement a sequence of operations to implement a second rule set F(2) at a subsequent time period. A transition protocol may be utilized in updating from rule set F(1) to rule set F(2). The transition protocol may be implemented with multiple operations to ensure individual switches consistently utilize a single set of rules in routing packets on the network 10.

In an example of FIG. 2, the switches 20 in the network that are to maintain their next hop to be the same after the updated rule set F(2) is implemented continue routing to their respective next hop (212). The switches that are to have their next hop changed as a result of the second rule set F(2) route their data packets to the controller 100 (214).

Subsequently, the controller forwards data packets it receives from the switches 20 to destination nodes in accordance with the updated rule set F(2) (216). The controller 100 does not necessarily need to send packets to next hops for those switches 20 that forwarded packets. Rather, the controller 100 can forward the packets to a node (e.g., downstream node) along the route of the data packet to ensure the data packet is received at its final destination.

Subsequently, the controller 100 implements the second rule set for the switches 20 (220). After a duration in which the transition rules 121 are signaled to the switches 20, the second rule set F(2) can be signaled to the switches 20.

The timing in which the controller 100 implements the second rule set F(2) can be set by a duration that is determined by timing logic 140. In particular, the timing logic 140 determine a transition time that corresponds to each switch acknowledging the transition rule set 121, followed by an interval that corresponds to a measurement of network latency (e.g., the estimated maximum time for a data packet to traverse the network).

In examples described by FIG. 1 and FIG. 2, each rule set may be implemented as a transfer function. For a packet p, it is assumed there is a network transfer function F(p). For purpose of description below, the transfer function F1(p) represents the Rule Set 1, the transfer function F2(p) represents the Rule Set 2, and the transfer function F12(p) represents the transition rules between Rule Set 1 and 2.

With further reference to examples of FIG. 1 and FIG. 2, an embodiment recognizes that a given switch cannot anticipate if other switches 20 in the network are forwarding packets according to Rule Set 1 or Rule Set 2. Furthermore, an embodiment recognizes that it is unsafe for any switch 20 to forward a packet which will be handled differently under different rule implementations provided from the controller 100. However, an embodiment also recognizes that it is safe for the data packets to be sent to the controller 100. Conversely, if a switch 100 will not modify a packet under the Rule Set 2, the switch can send the data packet on.

Each switch therefore sends to the controller those packets it will handle differently under Rule Set 2 and Rule Set 1. These packets are handled by transition rules which direct the packets to the controller 100. Once the controller 100 receives acknowledgement from each switch that it has received the transition rules, it can determine when it is safe to determine that no switches are forwarding packets in accordance with the Rule Set 1. Once this confirmation is made, the controller 100 can send Rule Set 2 to the switches.

According to some embodiments, the controller 100 implements the change to the rule set during four sequential epochs, each measured at the controller 100. In the first epoch, all switches are using Rule Set 1. A transfer function at each switch is $f^s_1$, and each packet is processed exclusively by this family of transfer functions. As such, $F(p)=F1(p)$ for all packets p.

In the second epoch, the transfer functions $f^s_{12}$ are loaded onto each switch. During this epoch, the transfer function at a switch starts at $f^s_1$ and ends as $f^s_{12}$. Thus, $F(p)=F1(p)$ or $F12(p)$ for each packet p, depending upon the relative arrival time of $f^s_{12}$ and p at each switch s for which $f^s_1(p)$ does not equal $f^s_{12}(p)$.

Each switch sends a completion signal to the controller when a new rule set is loaded. Once the last switch has sent a completion signal to the controller, the controller waits for the maximum network latency.

At this point, controller 100 recognizes epoch three. At the start of epoch three, the controller sends $f^s_2$ to all switches, and releases all packets sent to the controller 100 during epoch two. During epoch three, $F_p=F_{12}(p)$ or $F_2(p)$ for each packet p, depending upon the relative arrival time of $f^s_2$ and p at each switch s. Since a packet p may arrive at a switch s whose transfer function is still $f^s_{12}$, the packet may be sent to the controller 100. However, the controller 100 can continuously releases packets sent to the controller during epoch three, and so these packets will be delivered to their destination. As a result, all packets sent during epoch three have $F(p)=F_2(p)$.

Once the last completion signal has been sent to the controller 100 from the switches, the controller 100 waits for the maximum network latency. Epoch four then begins. During Epoch four, $f^s=f^s_2$ for all switches s, and all packets sent into the network in epoch four are processed entirely by switches using the transfer function $f^s_2$; hence $F(p)=F2(p)$ for all packets p. After epoch four begins, a new update can begin at any time. The four epochs are summarized in Table 1.

| Epoch | Transfer Function | Packet Function | End |
|---|---|---|---|
| 1 | $f^s_1$ | $F_1$ | $f^s_{12}$ sent to switches |
| 2 | $f^s_1 \rightarrow f^s_{12}$ | $F_1 \rightarrow F_{12}$ | One max network latency after completion signal |

-continued

| Epoch | Transfer Function | Packet Function | End |
|---|---|---|---|
| 3 | $f_{12}^s \rightarrow f_2^s$ | $F_{12} \rightarrow F_2$ | One max network latency after completion signal |
| 4 | $f_2^s$ | $F_2$ | N/A |

Example Network Implementation

Figure 3A:
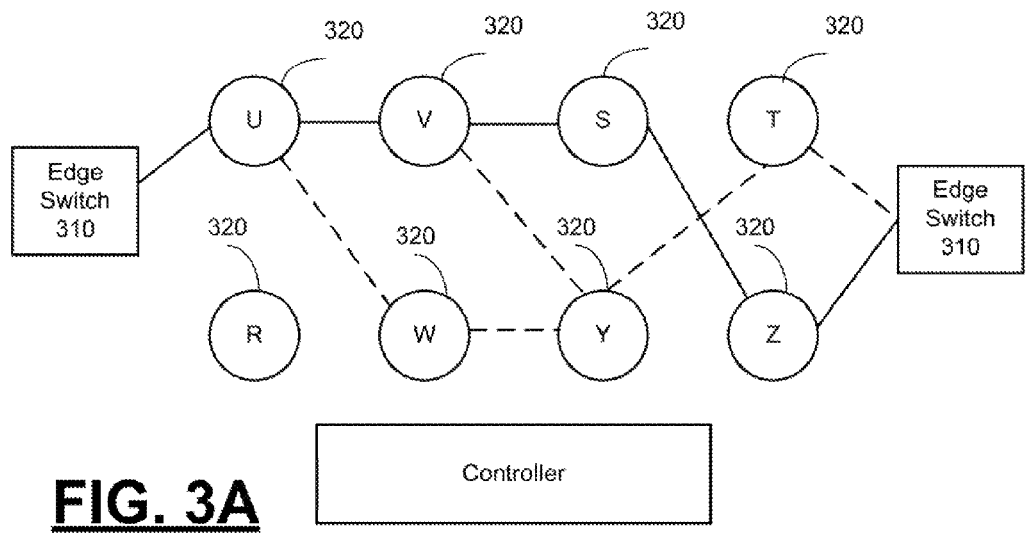
FIG. 3A and FIG. 3B illustrate examples for updating rule sets for routing data packets, including implementing a transition protocol when updating the rule sets.
Figure 3B:
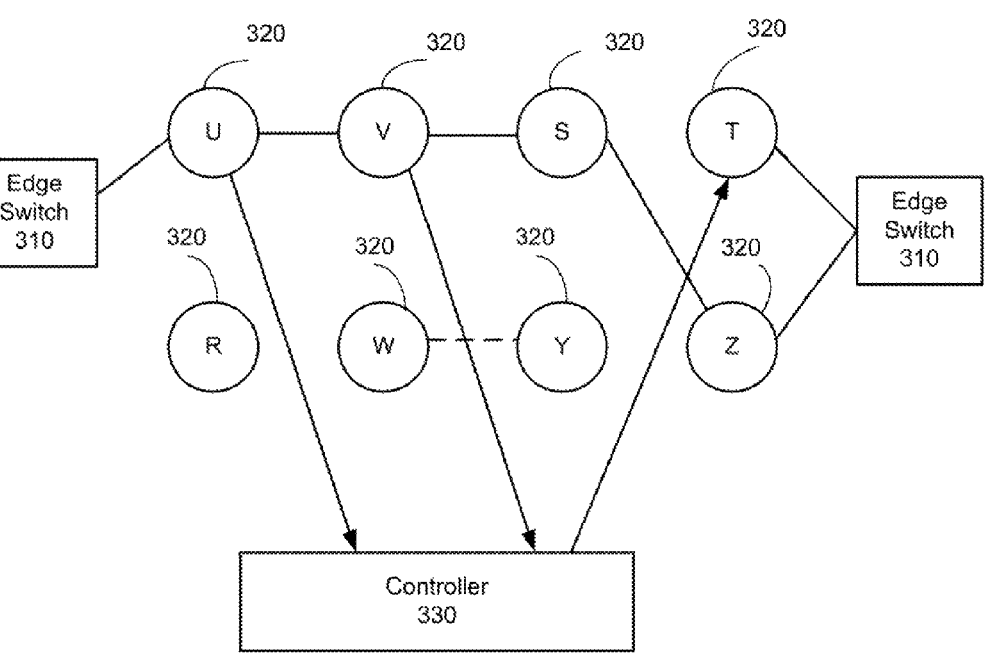

FIG. 3A and FIG. 3B illustrate examples for updating rule sets for routing data packets, including implementing a transition protocol when updating the rule sets.

More specifically, FIG. 3A illustrates the network 300 includes edge switches 310, a group of switches 320 that route packets, and a controller 3330. The Rule Set 1 ($f^s_1$) is represented by solid lines and illustrates the routing performed by each switch when the first rule set is in implementation. The Rule Set 2 ($f^s_2$) is represented by dashed lines and illustrates the routing performed by each switch 320 when the second rule set is in implementation. A transition protocol in accordance with various examples described herein may be implemented in order to enable the network 300 to transition from implementing Rule set 1 to Rule Set 2. The implementation of the transition protocol is illustrated by FIG. 3B.

In the example of FIG. 3B, the network 300 with the group of switches incorporating the transition set of rules ($f^s_{12}$). The transition set of rules are shown in broken rules. During a transition period, some of the switches 320 forward packets to the controller 310. As shown by an example of FIG. 3A and FIG. 3B, switches 320 (u, v) have their respective next hop changed as between Rule Set 1 and Rule Set 2. Accordingly, the switches 320 (u,v) forward packets to the controller 310 during the transition phase, as shown by FIG. 3B.

The other switches 320 (w, y, s, z and t) do not have changes to their respective next hops as a result of the Rule Set 1 being updated by the Rule Set 2. Instead, each of the switches 320 (w, y, s, z and t) forwards packets according to either Rule Set 1 ($f^s_1$) or Rule Set 2($f^s_2$).

In the example of FIG. 3B, packets that are communicated from, for example, edge nodes 302 to edge node 304, and for which the routing is changing as a result of the change in rule sets are handled at either switch 320 (u) (in which case the packet is forwarded to the controller 330), or by switch (v) (in which case the packet is routed to the controller 320). Otherwise, the packets were handled by the Rule Set 1 ($f^s_1$), and the handling would be the same as for Rule Set 2 ($f^s_2$).

With regard to switches w, t, the switches do not receive packets under Rule Set 1 ($f^s_1$), and therefore will not handle packets in the transition. These switches can thus forward packets as before.

Controller Hardware

Figure 4:
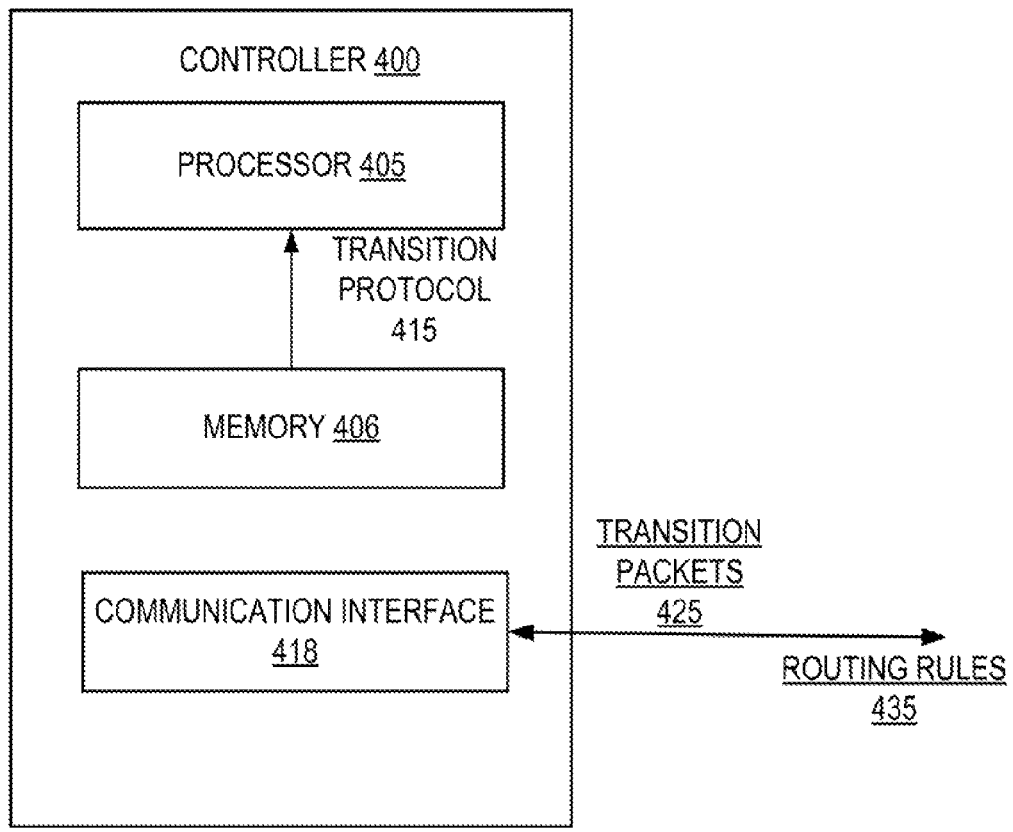
FIG. 4 illustrates an example controller for use with a network, as described with examples of FIG. 1, FIG. 2 and FIG. 3A and FIG. 3B.

FIG. 4 illustrates an example controller for use with a network, as described with examples of FIG. 1, FIG. 2 and FIG. 3A and FIG. 3B. The controller 400 can be implemented in a variety of forms, including as a dedicated appliance, or through software executed on a server or machine. The controller 400 can include processor 405, memory resources 406, and a communication interface 418. The memory resources 406 can store instructions that enable the processor to implement functionality, including a transition protocol 415 (e.g., transition rules based an update to an existing rule set). The processor 405 can execute the instructions for the transition protocol 415. In implementing the transition protocol 415, the processor 405 can communicate with the communication interface 418 to send routing rules (E.g., transition rules, update rules), as well as to receive and forward transition packets 425.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What claimed is:

1. A non-transitory computer-readable medium storing machine-readable instructions for operating a controller on a network, wherein the instructions are such that they, when executed by one or more processors, cause the one or more processors to:
    transition a group of switches of the network from implementing a first rule set for routing packets to implementing a second rule set for routing packets by,
        instructing the group of switches to implement, during a first transition period, a transition rule set for routing packets according to which each switch in the group of switches is to, for a given packet:
            if a next hop of the packet would be the same according to the first rule set and the second rule set, then forward the packet to the next hop for the packet according to the second rule set, and
            otherwise forward the packet to the controller;
        during a second transition time period following the first transition period, instructing the group of switches to implement the second rule set.

2. The computer-readable medium of claim 1, wherein the instructions are further to cause the one or more processors to:
    end the first transition period a specified amount of time after when each switch in the group of switches acknowledges the transition rule set.

3. The computer-readable medium of claim 2, wherein the specified amount of time includes a latency measurement that is estimated as a maximum time in which a packet can spend transitioning the group of switches.

4. The computer-readable medium of claim 1, wherein the instructions include instructions for marking the second rule set as being implemented a duration after every switch in the group of switches acknowledges the second rule set.

5. The computer-readable medium of claim 4, wherein the duration includes a latency measurement that is estimated as a maximum time in which a packet can spend transitioning the group of switches.

6. The computer-readable medium of claim 1 wherein the controller operates as an OpenFlow controller.

7. The computer-readable medium of claim 1, wherein the instructions are further to cause the one or more processors to:
    during the second transition time period, send packets received by the controller from the group of switches in the first transition period and to respective destination nodes for the packets in accordance with the second rule set.

8. The computer-readable medium of claim 1, wherein the instructions are further to cause the one or more processors to:
    during the second transition time period, send packets received by the controller from the group of switches in the second transition period and to respective destination nodes for the packets in accordance with the second rule set.

9. A method for transitioning a group of switches on a network from implementing a first rule set for routing packets to implementing a second rule set for routing packets, the method comprising:
  instructing the group of switches to implement a transition rule set during a first transition period, wherein the transition rule set is such that, at each switch of the group of switches, a next hop for each packet according to the transition rule set is:
    a next hop for the packet according to the second rule set when the next hop of the packet according to the second rule set is the same as a next hop for the packet according to the first rule set, and
    a controller of the network when the next hop of the packet according to the second rule set is not the same as the next hop for the packet according to the first rule set;
  upon an end of the first transition period, instructing the group of switches to implement the second rule set.

10. The method of claim 9, further comprising:
  determining a first amount of time for waiting based on a measurement of latency of the network; and
  ending the first transition period at least the first amount of time after a timing at which all of the switches in the group of switches have acknowledged implementation of the transition rule set.

11. The method of claim 9, further comprising:
  during the first transition period, holding, at the controller, packets received by the controller from the group of switches, and
  during a second transition period following the first transition period, forwarding the held packets to respective destination nodes of the packets according to the second rule set.

12. The method of claim 11, further comprising:
  during the second transition period, forwarding packets received by the controller from the group of switches during the second transition period to respective destination nodes of the packets according to the second rule set.

13. The method of claim 11, further comprising:
  determining a second amount of time for waiting based on a measurement of latency of the network; and
  ending the second transition period and marking the second rule set as being implemented at least the second amount of time after a timing at which all of the switches in the group of switches have acknowledged implementation of the second rule set.

14. An controller to control a group of switches of a network, the controller comprising:
  a processor; and
  a non-transitory storage medium storing instructions executable by the processor including transition protocol instructions that are to transition the group of switches from a currently implemented rule set ("first rule set") to a new rule set ("second rule set"), the transition protocol instructions including:
    instructions to determine a transition rule set such that, at each switch of the group of switches, a next hop for each packet according to the transition rule set is:
      a next hop for the packet according to the second rule set when the next hop of the packet according to the second rule set is the same as a next hop for the packet according to the first rule set, and
      the controller when the next hop of the packet according to the second rule set is not the same as the next hop for the packet according to the first rule set;
    instructions to, at a start of a first transition period, instruct the group of switches to change from implementing the first rule set to implementing the transition rule set, and
    instructions to, upon an end of the first transition period, instruct the group of switches to change from implementing the transition rule set to implementing the second rule set.

15. The controller of claim 14, wherein the transition protocol instructions further comprise:
  instructions to determine a first amount of time for waiting based on a measurement of latency of the network; and
  instructions to end the first transition period at least the first amount of time after a timing at which all of the switches in the group of switches have acknowledged implementation of the transition rule set.

16. The controller of claim 14, wherein the transition protocol instructions further comprise:
  instructions to, during the first transition period, hold, at the controller, packets received by the controller from the group of switches, and
  instructions to, during a second transition period following the first transition period, forward the held packets to respective destination nodes of the packets according to the second rule set.

17. The controller of claim 16, wherein the transition protocol instructions further comprise:
  instructions to, during the second transition period, forward packets received by the controller from the group of switches during the second transition period to respective destination nodes of the packets according to the second rule set.

18. The controller of claim 16, wherein the transition protocol instructions further comprise:
  instructions to determine a second amount of time for waiting based on a measurement of latency of the network; and
  instructions to end the second transition period and mark the second rule set as being implemented at least the second amount of time after a timing at which all of the switches in the group of switches have acknowledged implementation of the second rule set.

19. The controller of claim 16, wherein the transition protocol instructions further comprise:
  instructions to determine an amount of time for waiting based on a measurement of latency of the network;
  instructions to end the first transition period at least the amount of time after a timing at which all of the switches in the group of switches have acknowledged implementation of the transition rule set; and
  instructions to end the second transition period and mark the second rule set as being implemented at least the amount of time after a timing at which all of the switches in the group of switches have acknowledged implementation of the second rule set.

20. The controller of claim 14, wherein the controller is to operate as an OpenFlow controller.

* * * * *